US012431640B2

(12) United States Patent
Baydoun et al.

(10) Patent No.: US 12,431,640 B2
(45) Date of Patent: Sep. 30, 2025

(54) STACKABLE TERMINAL ASSEMBLY

(71) Applicant: FORD GLOBAL TECHNOLOGIES, LLC, Dearborn, MI (US)

(72) Inventors: Mohammed M. Baydoun, Dearborn Heights, MI (US); Hassan A. Haidar, Dearborn Heights, MI (US); Fawwaz Muraisi, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 18/210,125

(22) Filed: Jun. 15, 2023

(65) Prior Publication Data

US 2024/0421514 A1 Dec. 19, 2024

(51) Int. Cl.
*H01B 7/282* (2006.01)
*H01R 4/34* (2006.01)
*H01R 11/12* (2006.01)

(52) U.S. Cl.
CPC ................ *H01R 11/12* (2013.01); *H01R 4/34* (2013.01); *H01R 2201/26* (2013.01)

(58) Field of Classification Search
CPC .... H01B 7/282; H01R 11/12; H01R 2201/26; H01R 4/34; H01R 4/06; H01R 4/48; Y10S 439/907
USPC ........................ 174/72 A; 439/287, 883, 907
See application file for complete search history.

(56) References Cited

U.S. PATENT DOCUMENTS

| | | | | |
|---|---|---|---|---|
| 5,865,637 | A * | 2/1999 | Shinozaki | H01R 11/12 439/907 |
| 5,934,923 | A * | 8/1999 | Matsuoka | H01R 11/12 439/287 |
| 7,506,439 | B2 | 3/2009 | Tanaka et al. | |
| 2005/0003703 | A1* | 1/2005 | Ono | H01R 11/26 439/516 |
| 2014/0235078 | A1* | 8/2014 | Omori | H01R 13/648 439/98 |
| 2014/0377975 | A1* | 12/2014 | Omori | H01R 4/64 439/284 |
| 2015/0064989 | A1 | 3/2015 | Hirasawa | |

(Continued)

FOREIGN PATENT DOCUMENTS

| | | |
|---|---|---|
| GB | 2596584 B | 5/2022 |
| JP | 9320648 A | 12/1997 |

(Continued)

*Primary Examiner* — Timothy J Thompson
*Assistant Examiner* — Guillermo J Egoavil
(74) *Attorney, Agent, or Firm* — Frank L. Lollo

(57) ABSTRACT

A stackable terminal assembly mounted to structure, including a first eyelet terminal body having a flat base portion, an upstanding wall extending from the base portion generally normal thereto, and a mounting feature for securing the first eyelet terminal body to the structure; and a second eyelet terminal body having a flat base and configured to extend generally parallel to the structure between the base portion and the structure, a second mounting feature configured to allow for securement of the second eyelet terminal body between the structure and the first eyelet terminal body. Wiring harnesses connected to the first and second eyelet terminal bodies may be segregated with a first wiring harness connected to the first eyelet terminal body in a non-sealing fashion and a second wiring harness connected to the second eyelet terminal body in a sealing fashion.

11 Claims, 3 Drawing Sheets

(56) References Cited

U.S. PATENT DOCUMENTS

| | | | | |
|---|---|---|---|---|
| 2015/0155670 | A1* | 6/2015 | Gardner | H01R 13/6463 439/587 |
| 2016/0079684 | A1* | 3/2016 | Naganishi | H01R 11/12 439/877 |

FOREIGN PATENT DOCUMENTS

| | | | |
|---|---|---|---|
| JP | 4297293 | B2 | 8/1999 |
| WO | 2014173698 | A1 | 10/2014 |

* cited by examiner

STACKABLE TERMINAL ASSEMBLY

BACKGROUND OF THE INVENTION

The present invention relates to a stackable terminal assembly for electric wires.

When grounding wiring harnesses in vehicles, it is known to provide sealing for a wiring harness at an eyelet having a U-shaped configuration (i.e., a pair of upstanding legs on either side of a flat surface). The U-shape for the wiring harness eyelet provides bend strength but may make sealing of the wiring harness more difficult than is desired.

SUMMARY OF THE INVENTION

An embodiment contemplates a stackable terminal assembly mounting to structure including: a first eyelet terminal body having a base portion that is generally flat and configured to extend generally parallel to the structure, an upstanding wall extending from the base portion generally normal to the base portion, and a mounting feature configured to allow for securement of the first eyelet terminal body to the structure; and a second eyelet terminal body having a flat base that is generally flat and configured to extend generally parallel to the structure between the base portion and the structure, a second mounting feature configured to allow for securement of the second eyelet terminal body between the structure and the first eyelet terminal body.

An embodiment contemplates a stackable terminal assembly configured to mount to structure, the stackable terminal assembly including: a first eyelet terminal body having a base portion that is generally flat and configured to extend generally parallel to the structure, and a mounting feature configured to allow for securement of the first eyelet terminal body to the structure; a second eyelet terminal body having a flat base that is generally flat and configured to extend generally parallel to the structure between the base portion and the structure, a second mounting feature configured to allow for securement of the second eyelet terminal body between the structure and the first eyelet terminal body; a first wiring harness connected to the first eyelet terminal body without the connection to the first eyelet terminal body being sealed; a second wiring harness connected to the second eyelet terminal body; and a seal surrounding and sealing the connection of the second wiring harness to the second eyelet terminal body.

An advantage of an embodiment is that it allows for wire grounding of multiple wiring harnesses while minimizing a height of upstanding walls from the grounding surface (e.g., shorter overall height from chassis to distal end of upstanding walls). A shorter overall height of upstanding walls allows for a more desirable package size while also providing desired bend strength of the terminal assembly. An advantage of an embodiment is that the second eyelet terminal body is configured to jog around the first eyelet terminal body where the wiring harnesses are connected, thus avoiding interference between the two wiring harnesses. An advantage of an embodiment is that the jog in the second eyelet terminal body may jog to the left, the right or both directions. An advantage of an embodiment is that the stackable terminal assembly provides a relatively slim overall footprint (i.e., relatively narrow and short size) at the location where it connects to the vehicle structure (e.g., chassis). An advantage of an embodiment is that the stackable terminal assembly may allow for a drop-in replacement (i.e., fits in the same package space) for previous designs of grounding terminals. An advantage of an embodiment is that wiring harnesses not needing wire sealing may be attached to the first eyelet terminal body and wiring harnesses where wire sealing is desirable may be attached to the second eyelet terminal body, which may be easier to seal since it does not include upstanding walls. Sealing on the second eyelet terminal with glue or heat shrink may be easier without the upstanding walls. An advantage of an embodiment is that the stackable terminal assembly provides the separate second eyelet terminal body to attached circuits that are preferably sealed or isolated from other circuits, which may be attached to the first eyelet terminal body.

DETAILED DESCRIPTION

Figure 1:
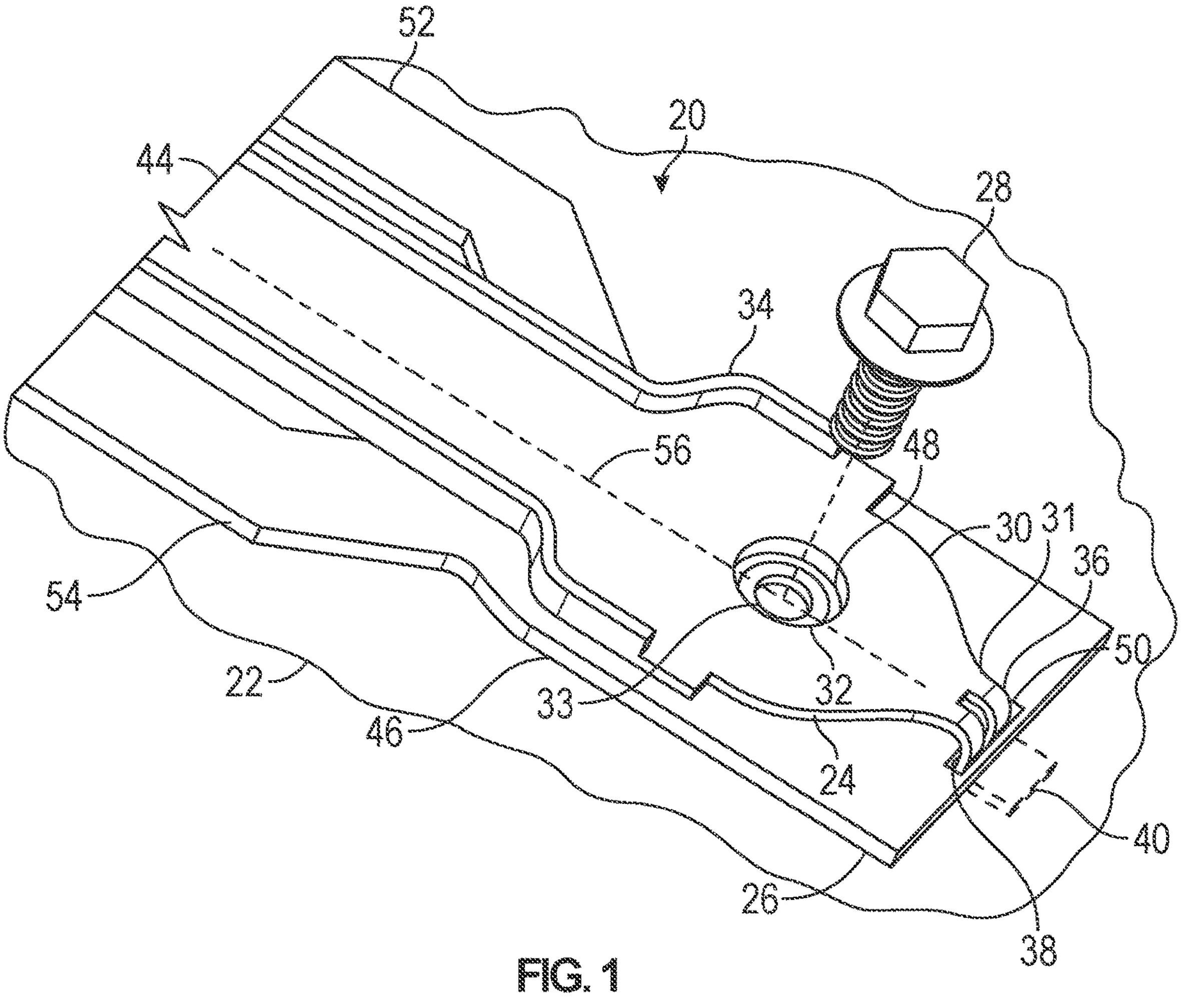
FIG. 1 is a schematic perspective view of a portion of a stackable terminal assembly and a portion of a structure of a vehicle.

FIG. 1 illustrates an example of a stackable terminal assembly 20 configured to mount to structure 22 (e.g., vehicle structure, such as a chassis) to provide grounding for wire harnesses (illustrated in FIGS. 2-4) to the structure 22. The stackable terminal assembly 20 includes a first eyelet terminal body 24, a second eyelet terminal body 26 and a fastener 28 (e.g., a grounding bolt).

The first eyelet terminal body 24 includes a flat base portion 30 having a fastener hole 32 therethrough that receives the fastener 28. The fastener hole 32 is configured to align with a fastener hole 33 in the structure 22. The first eyelet terminal body 24 includes upstanding walls 34 extending from opposed sides of the flat base portion 30 around at least a portion of a perimeter of the flat base portion 30 and extending generally normal to the flat base portion 30 and away from the structure 22. The upstanding walls 34 may provide increased bending strength for the stackable terminal assembly 20. The first eyelet terminal body 24 includes a key 36 extending from the flat base portion 30 at an end 31 opposed to a second end 44 that is used to secure a wire harness thereto. The key 36 includes an upstanding flange 38, which extends from the flat base portion 30 toward the structure 22, and a securement flange 40, which extends from a distal end of the upstanding flange 38 in a direction generally parallel to and away from the flat base portion 30. The upstanding flange 38 and securement flange 40 are configured to slide within a keyhole 42 (illustrated in FIG. 2) in the structure 22 to generally orient the first eyelet terminal body 24 relative to the structure 22. The length of the upstanding flange 38 is sufficient to extend through the thickness of the second eyelet terminal body and the thickness of a portion 45 of the surface of the structure 22 at the keyhole 42, thus allowing the securement flange 40 to nest on an opposite side of that surface portion 45 of the structure 22.

The second eyelet terminal body 26 includes a flat base 46 having a fastener hole 48 therethrough that aligns with fastener holes 32 and 33 and receives the fastener 28 for securing the stackable terminal assembly 20 to the structure 22. The flat base 46 is mounted between the flat base portion 30 and the structure 22, and, since the second eyelet terminal body 26 does not have upstanding walls, the first and second eyelet terminal bodies 24, 26 can mate flush together in a compact fashion. Moreover, the upstanding walls 34 of the first eyelet terminal body 24 provide increased bending strength for the second eyelet terminal body 26 in addition to the first eyelet terminal body 24. The flat base 46 includes a slotted hole 50 that aligns with and receives the securement flange 40 and the upstanding flange 38 therethrough to generally orient the second eyelet terminal body 26 to the structure 22. The flat base 46 includes a first arm 52, a second arm 54 or both arms. The first arm 52 angles laterally away from a longitudinal axis 56 defined by the center of the fastener hole 48 and the slotted hole 50; in this way the wiring harness connected to the first arm 52 does not interfere with the wiring harness connected to the second end 44 of the first eyelet terminal body 24. The second arm 54, if employed for the particular assembly, may angle laterally away from the longitudinal axis 56 in an opposite lateral direction (i.e., extending leftward rather than rightward) from the first arm 52.

Figure 2:
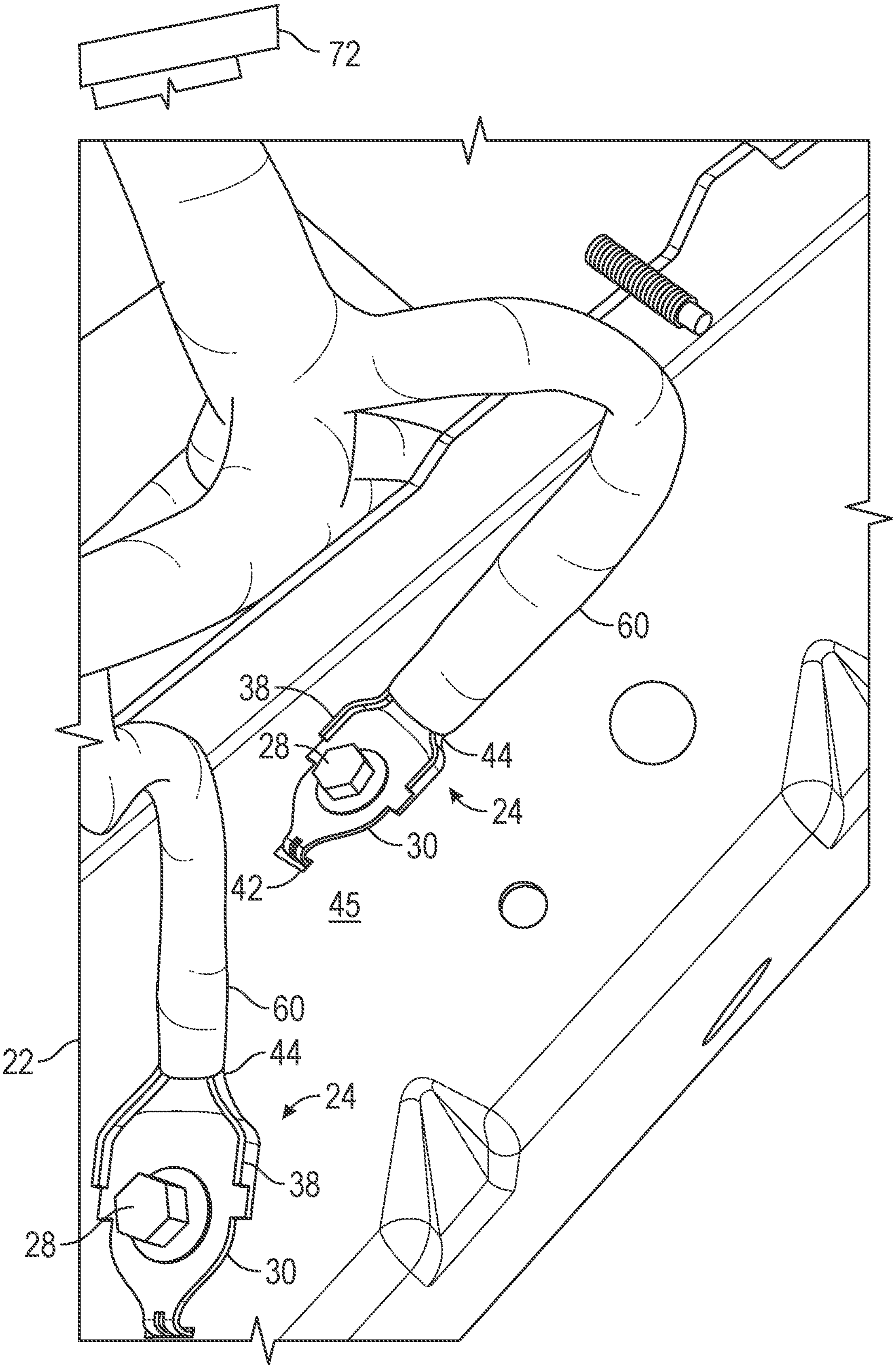
FIG. 2 is a schematic perspective view of a portion of a stackable terminal assembly and a portion of a structure of a vehicle.

FIG. 2 illustrates an example of two of the first eyelet terminal bodies 24 mounted to the structure 22, without the second eyelet terminal body shown in this Figure. The upstanding flange 38 is secured in the keyhole 42 and the fastener 28 is secured in the fastener hole in the structure 22, as discussed relative to FIG. 1. For each of the first eyelet terminal bodies 24 illustrated in FIG. 2, a respective first wiring harness 60 is connected (e.g., by heat stake ultrasonic welding) to the corresponding second end 44 of the flat base portion 30. This provides grounding of the respective first wiring harnesses 60. In the stackable terminal assembly 20, the second eyelet terminal body (or bodies) 26 (illustrated in FIGS. 1 and 3-4) are mounted between the respective first eyelet terminal body 24 and the structure 22. The location where the first wiring harnesses 60 connect to respective second ends 44 may or may not be sealed based on the particular application. In the stackable terminal assembly 20 illustrated herein, the first wiring harnesses 60 may extend from the second end 44 to components 72 where sealing is not needed and thus the connection to the first eyelet terminal body is not sealed.

Figure 3:
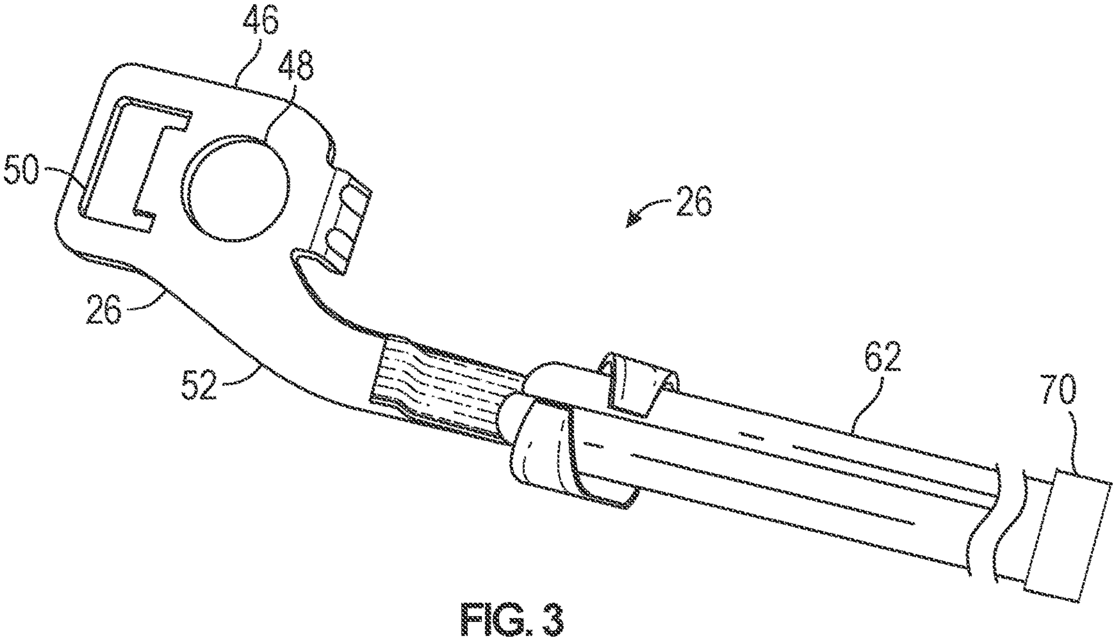
FIG. 3 is a schematic perspective view of a portion of a stackable terminal assembly.
Figure 4:
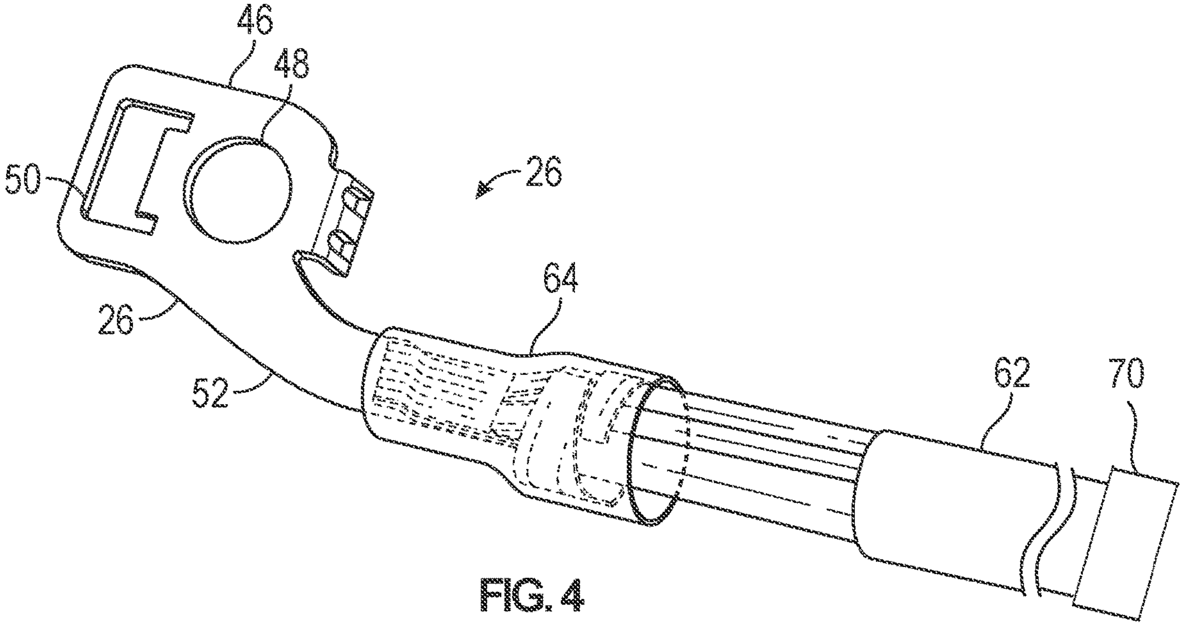
FIG. 4 is a schematic perspective view of a portion of a stackable terminal assembly.

FIGS. 3 and 4 illustrate examples of a second eyelet terminal body 26 connected to a second wiring harness 62. The second eyelet terminal body 26 includes the flat base 46, fastener hole 48, slotted hole 50, and first arm 52, as discussed relative to FIG. 1, but without the second arm illustrated. The second wiring harness 62 for the second eyelet terminal body 26 may extend from the first arm 52 to components 70 that are sealed. FIG. 3 illustrates the second eyelet terminal body 26 without sealing, while FIG. 4 illustrates the second eyelet terminal body 26 with a seal (e.g., heat shrink sleeve) 64 added to prevent moisture from migrating up a wire in the second wiring harness 62 to the component(s) 70. The second eyelet terminal body 26, being substantially flat without upstanding walls, allows for easier sealing of the wiring harness. The wires making up the different wiring harnesses 60, 62 may be segregated so that wires that lead to components 72 that don't need sealing (non-sealed components) are contained in the first wiring harness 60 connected to the first eyelet terminal body 24 and wires that lead to components 70 where sealing is desired are contained in the second wiring harness 62 and the seal 64 is employed at the first arm 52. The second eyelet terminal body 26 illustrated in FIGS. 3-4 is mounted between a corresponding first eyelet terminal body 24 (illustrated in FIGS. 1 and 2) and the structure 22 (illustrated in FIG. 2).

While certain embodiments of the present invention have been described in detail, those familiar with the art to which this invention relates will recognize various alternative designs and embodiments for practicing the invention as defined by the following claims.

The invention claimed is:

1. A stackable terminal assembly configured to mount to a structure in a vehicle, the stackable terminal assembly comprising:

a first eyelet terminal body having a base portion that is generally flat and configured to extend generally parallel to the structure, a pair of upstanding wall walls extending from opposed sides of the base portion generally normal to the base portion, and a mounting feature configured to allow for securement of the first eyelet terminal body to the structure; and a second eyelet terminal body having a flat base that is generally flat and configured to extend generally parallel to the structure between the base portion and the structure, a second mounting feature configured to allow for securement of the second eyelet terminal body between the structure and the first eyelet terminal body, wherein the second eyelet terminal body includes a first arm extending from the flat base so that it is laterally offset from an end of the first eyelet terminal body where the first eyelet terminal body connects to a wiring harness, whereby the first arm has a bending strength increased by the pair of upstanding walls of the first eyelet terminal body.

2. The stackable terminal assembly of claim 1 further including a sealed wiring harness connected to the second eyelet terminal body and a seal surrounding and sealing the connection of the sealed wiring harness to the second eyelet terminal body.

3. The stackable terminal assembly of claim 2 further including a non-sealed wiring harness connected to the first eyelet terminal body, with the connection between the non-sealed wiring harness and the first eyelet terminal body being unsealed against moisture.

4. The stackable terminal assembly of claim 1 wherein the mounting feature is a fastener hole, the second mounting feature is a second fastener hole aligned with the fastener hole, and a fastener is configured to extend through the fastener hole and the second fastener hole and secure to the structure.

5. The stackable terminal assembly of claim 4 wherein the second mounting feature further includes a keyhole, and the mounting feature further includes a key configured to extend through the keyhole and the structure to orient the stackable terminal assembly relative to the structure.

6. The stackable terminal assembly of claim 1 wherein the second mounting feature includes a keyhole, and the mounting feature includes a key configured to extend through the keyhole and a portion of the structure.

7. The stackable terminal assembly of claim 1 wherein the second eyelet terminal body includes a second arm extending from the flat base so that it is laterally offset from both the end of the first eyelet terminal body and an end of the first arm where the first arm connects to a second wiring harness.

8. A stackable terminal assembly configured to mount to a structure in a vehicle, the stackable terminal assembly comprising:

a first eyelet terminal body having a base portion that is generally flat and configured to extend generally parallel to the structure, a pair of upstanding walls extending from opposed sides of the base portion generally normal to the base portion, and a mounting feature configured to allow for securement of the first eyelet terminal body to the structure;

a second eyelet terminal body having a flat base that is generally flat and configured to extend generally parallel to the structure between the base portion and the structure, a second mounting feature configured to allow for securement of the second eyelet terminal body between the structure and the first eyelet terminal body;

a first wiring harness connected by a first connection to the first eyelet terminal body without the first connection to the first eyelet terminal body being sealed;

a second wiring harness connected by a second connection to the second eyelet terminal body; and a seal surrounding and sealing the second connection of the second wiring harness to the second eyelet terminal body;

wherein the second eyelet terminal body includes a first arm extending from the flat base so that it is laterally offset from an end of the first eyelet terminal body where the first eyelet terminal body connects to the first wiring harness, whereby the first arm has a bending strength increased by the pair of upstanding walls of the first eyelet terminal body.

9. The stackable terminal assembly of claim 8 wherein the second eyelet terminal body includes a second arm extending from the flat base so that it is laterally offset from both the location where the first eyelet terminal body connects to the first wiring harness and a second location where the first arm connects to the second wiring harness.

10. The stackable terminal assembly of claim 8 wherein the second mounting feature includes a keyhole, and the mounting feature includes a key configured to extend through the keyhole and a portion of the structure.

11. The stackable terminal assembly of claim 8 wherein the mounting feature is a fastener hole, the second mounting feature is a second fastener hole aligned with the fastener hole, and a fastener is configured to extend through the fastener hole and the second fastener hole and secure to the structure.

* * * * *